United States Patent [19]

Dubrow et al.

[11] Patent Number: 4,595,635
[45] Date of Patent: Jun. 17, 1986

[54] ORGANOPOLYSILOXANE MATERIALS HAVING DECREASED SURFACE TACK

[75] Inventors: Robert S. Dubrow, Redwood City; Catherine A. Dittmer, Mountain View; William D. Uken, Fremont, all of Calif.

[73] Assignee: Raychem Corporation, Menlo Park, Calif.

[21] Appl. No.: 730,692

[22] Filed: May 2, 1985

[51] Int. Cl.$^4$ .................................................. B05D 3/06
[52] U.S. Cl. ......................................... 428/447; 522/33; 427/54.1; 522/46; 522/48; 522/65
[58] Field of Search ................. 427/54.1, 44; 428/447; 204/159.13

[56] References Cited

U.S. PATENT DOCUMENTS 4,163,082 7/1979 Romenesko .......................... 427/54.1
4,496,696 1/1985 Kurita .............................. 204/159.13

Primary Examiner—John H. Newsome
Attorney, Agent, or Firm—T. Gene Dillahunty

[57] ABSTRACT

This invention provides organopolysiloxane materials having cone penetration between about 100 and about 350 ($10^{-1}$ mm) and ultimate elongation of at least 100% and having reduced surface tack. This invention provides three methods of obtaining said materials with reduced surface tack. The first method comprises applying to the surface of such material an organic peroxide or a photoinitiator and irradiating the surface with ultraviolet light to further crosslink the surface to reduce or eliminate the tack of the surface. The second method comprises mixing a photoinitiator, such as benzophenone, in an organopolysiloxane fluid, thermally crosslinking the organopolysiloxane fluid to produce the material with the above cone penetration and ultimate elongation then irradiating the surface of the material with ultraviolet light to reduce or eliminate the tack of the surface. The third method comprises mixing a photoinitiator, such as benzophenone, in an organopolysiloxane fluid, crosslinking the fluid by irradiating a layer of the fluid with ultraviolet light to produce the above cone penetration and ultimate elongation properties then further irradiating the crosslinked material to reduce or eliminate the surface tack; this method can be carried out by simultaneous irradiation with ultraviolet light from two sides of a layer of the organopolysiloxane wherein one surface is irradiated at a higher intensity than the other surface. The materials produced by this invention are useful as tapes and sealants.

20 Claims, No Drawings

ORGANOPOLYSILOXANE MATERIALS HAVING DECREASED SURFACE TACK

FIELD OF THE INVENTION

This invention relates to organopolysiloxane materials having a cone penetration between about 100 and about 350 ($10^{-1}$ mm) (ASTM No. D217-68) and ultimate elongation of at least about 100% (ASTM No. D638-80) and in particular is related to reducing the surface tack of these materials.

BACKGROUND OF THE INVENTION

A wide variety of organopolysiloxanes are known in the art and have been used for a wide variety of purposes. This invention relates to those organopolysiloxanes having the above cone penetration and ultimate elongation properties which material also have a very high surface tackiness. These materials are useful as sealants and encapsulants to protect substrates from environmental exposure and are particularly useful in thin sheets or tapes having a thickness of 5 mm or less. Due to the surface tackiness and other properties of these materials, they are difficult to handle. The handling qualities can be improved by crosslinking the organopolysiloxane in a flexible matrix as disclosed in copending application U.S. Ser. No. 507,435 filed June 23, 1981 now abandoned. When such materials are wrapped around a substrate or applied to a substrate the exposed surface of the material remains tacky. It is desirable to provide such a material which has a reduced or non-tacky surface when installed on a substrate.

U.S. Pat. No. 4,163,082 to Romenesko discloses reducing or eliminating surface tack on organopolysiloxane gels or greases by applying to the surface of the gel or grease an additional layer of a liquid organopolysiloxane composition which is UV curable then curing the coating by ultraviolet radiation. U.S. Pat. No. 4,364,809 to Sato et al. relates to organopolysiloxanes cured to rubbery elastomer thin sheets but does not particularly address the desirability of having a non-tacky surface thereon.

Other references which illustrate the general background of organopolysiloxane materials, their preparation, curing, and the like include U.S. Pat. Nos. 4,196,273 to Imai et al.; 3,624,022 to Ross; 4,064,027 to Gant and 4,163,081 to Schulz.

U.S. Pat. No. 2,762,609 to Lewis et al. relates to organopolysiloxanes which in one aspect are partially cured on one surface and left uncured on the other surface then installed on a substrate and then fully vulcanized in place.

The disclosures of the above patents are incorporated herein by reference with respect to the conventional and general background relative to the types of organopolysiloxane materials which may be crosslinked, the methods of crosslinking polysiloxanes, the initiators used to initiate the crosslinking and other conventional aspects of the organopolysiloxane art.

DESCRIPTION OF THE INVENTION

In one aspect, this invention relates to a method of reducing the surface tack of crosslinked organopolysiloxane materials having cone penetration between about 100 and about 350 ($10^{-1}$ mm) and ultimate elongation at least about 100% which comprises:

applying to the surface of said material an effective amount of an organic peroxide or a photoinitiator; and irradiating the surface with ultraviolet light to effect a further crosslinking of the surface of said material to reduce the surface tack thereof without effecting significant further crosslinking of said material below said surface.

In another aspect, this invention relates to a method of producing a crosslinked organopolysiloxane material having cone penetration between about 100 and about 350 ($10^{-1}$ mm) and ultimate elongation of at least about 100% and having reduced surface tack which comprises:

mixing in an organopolysiloxane fluid an effective amount of a photoinitiator;

thermally crosslinking said organopolysiloxane fluid to a cone penetration between about 100 and about 350 ($10^{-1}$ mm) and an ultimate elongation of at least about 100%; and irradiating the surface with ultraviolet light to effect a further crosslinking of the surface of said material to reduce the surface tack thereof without effecting significant further crosslinking of said material below said surface.

In another aspect, this invention relates to a method of producing a crosslinked organopolysiloxane material having cone penetration between about 100 and 350 ($10^{-1}$ mm) and ultimate elongation of at least about 100% and having reduce surface tack which comprises:

mixing in an organopolysiloxane fluid an effective amount of a photoinitiator;

crosslinking said organopolysiloxane fluid to a material having cone penetration between about 100 and about 350 ($10^{-1}$ mm) and an ultimate elongation of at least about 100% by irradiating said fluid with ultraviolet light; and irradiating a surface of said material with ultraviolet light to effect a further crosslinking of the surface of said material to reduce the surface tack thereof without effecting significant further crosslinking of said material below said surface.

As part of this aspect of the invention an organic peroxide can also be mixed in the organopolysiloxane fluid, the fluid crosslinked then the surface irradiated to reduce the surface tack. As another part of this aspect of the invention, the crosslinking of said fluid and the irradiating of a surface to reduce surface tack may be performed simultaneously by irradiating the fluid from two sides with different intensity irradiation.

In another aspect, this invention relates to organopolysiloxane materials which are produced by the above methods and have reduced or eliminated surface tack on at least one surface.

In another aspect, this invention relates to substrates having the above materials disposed thereon to provide environmental or other sealing or protection of the substrate.

The organopolysiloxanes useful in this invention may be any general purpose organopolysiloxane fluid which can be crosslinked to provide a cone penetration between about 100 and about 350 ($10^{-1}$ mm) and an ultimate elongation of at least 100%. These organopolysiloxanes may have various substituents thereon to provide particularly desired properties known in the prior art. A preferred class of organopolysiloxanes are the polydimethylsiloxanes which may be trimethyl terminated, vinyl terminated, methyl terminated, and the like. Other preferred classes of organopolysiloxane fluids include the polyvinylmethylsiloxanes copolymer with dimethylsiloxanes or methylsiloxanes with similar termination groups. A particularly preferred organopolysiloxane is the vinyl crosslinked organopolysiloxanes disclosed in copending application U.S. Ser. No. 730,402 filed of even date herewith the disclosure of which is incorporated herein by reference In general the organopolysiloxanes crosslinked to provide the above cone penetration and ultimate elongation properties which make them useful as sealants and materials for protecting substrates. The high surface tackiness of these materials provides a good seal with the substrate to prevent water or other contamination of the substrate. These materials also have good elastic recovery forces and self-healing properties as well as other characteristics which make them particularly useful.

The organic peroxides useful in the method of this invention include conventional organic peroxides which are useful in the photocuring of organopolysiloxanes, such as benzoyl peroxide, di-tert-butyl peroxide, tert-butyl cumyl peroxide, dicumyl peroxide, and peroxyesters such as tert-butyl peroxy, isopropylcarbonate, tert-butylperoxy benzoate and the like. Various other organic perioxides useful in this invention are enumerated in the background patents referred to above.

The photoinitiators useful in the methods of this invention are likewise well known in the art as conventional photoinitiators for ultraviolet radiation curing of organopolysiloxanes and include such compounds as benzophenone, acetophenone, anthraquinone, benzaldehyde, triphenylamine, 1-hydroxycyclohexylphenyl ketone, diethyoxyacetophenone, benzoinethers, 2-chlorothioxanthone, benzil and benzil ketals. Other similar photoinitiators will be be apparent from the background patents cited above as well as other sources.

When the organic peroxide or photoinitiator is applied to the surface of a crosslinked organopolysiloxane material according to this invention, the application may be by spraying, rolling, brushing, or other method of evenly distributing the organic peroxide or photoinitiator on the surface of said material. A preferred method of applying the organic peroxide or photoinitiator is in a solvent solution wherein the solvent is not incompatible with the crosslinked organopolysiloxane material and does not adversely affect the UV radiation crosslinking of the surface of the material. The organic peroxide or photoinitiator may be applied as a 0.1% by weight or higher solution provided that the surface of the crosslinked organopolysiloxane material is sufficiently coated with an effective amount thereof to effect the UV crosslinking of said surface. It is generally useful to use about 3% to about 10% solutions.

When the photoinitiator is mixed with the organopolysiloxane fluid before it is crosslinked, the photoinitiator can be present in any amount effective to provide efficient UV crosslinking of the organopolysiloxane fluid and/or the surface of the crosslinked material. An effective amount may range from about 0.05% to about 5.0% by weight based on the organopolysiloxane fluid. In general an effective amount will range from about 0.1% to about 1.0% and in many applications an effective amount will be about 0.5% by weight.

When the organopolysiloxane fluid is thermally crosslinked according to this invention, temperatures in the range of about 50° C. to about 250° C. are useful for most general purpose organopolysiloxane fluids.

The ultraviolet light used for crosslinking according to this invention is conventional high intensity UV radiation used for curing organopolysiloxane fluids. The intensity and time of exposure to achieve the crosslinking of the surface of the organopolysiloxane materials according to this invention will vary depending on the characteristics of the organopolysiloxane material as well as the organic peroxide or the photoinitiator used. In general, ultraviolet light having a power of 100 to 1500 watts and can be applied for a period of about 1 to about 300 seconds while from about 5 to about 120 seconds will in general produce the desired result according to this invention. When ultraviolet light is used to crosslink the organopolysiloxane fluid according to this invention as well as crosslink the surface of the resulting material conventional levels of irradiation with the ultraviolet light may be used to obtain the cone penetration and elongation by use desired according to this invention. It should also be noted that when ultraviolet light is used to crosslink the organopolysiloxane fluid as well as to crosslink the surface thereof these curing mechanisms may be performed simultaneously by providing ultraviolet light on both sides of a layer of the organopolysiloxane and providing a higher intensity on the side where it is desired to reduce or eliminate the surface tack.

The materials produced according to this invention may be used as sheets or tapes for environmental or other protection of substrates. When applied to the substrate the materials of this invention will have a surface exposed which has reduced or no surface tack.

This invention may be further illustrated by reference to the following examples:

EXAMPLE 1

An organopolysiloxane fluid, commercially available as KE 104 Gel from Shin-Etsu Chemical Co. Ltd of Tokoyo, Japan, and which is a platinum catalyzed addition cure, was thermally cured at a temperature of 150° C. to a cone penetration of 262 (ASTM No. D217-68) and ultimate elongation of 450% (ASTM No. D638-80) in the form of sheets 2, 3 and 4 mm thick, respectively, no additive was used in this example. Side 1 of each sheet was exposed to ultraviolet light at a power of 1500 watts, 12 inches from the sample, for up to 180 seconds as indicated in the following table. After exposure to the ultraviolet light, the surface tackiness or adhesion was measured on a Voland-Stevens LFRA Texture Analyzer. A tape or strip of each sheet is placed on a stage with a 0.5 inch hole. A 0.25 inch ball probe is pressed against the strip over the hole at a speed of 2.0 mm/sec. to a depth of 1.0 mm then retracted at the same speed of 2.0 m/sec. The adhesion values are given in grams in the following table for side 1 and side 2 of each of the three sheets.

TABLE 1

| Sample | Side | Adhesion | | | | | |
|---|---|---|---|---|---|---|---|
| | | time = 0 | 10 sec | 30 sec | 60 sec | 120 sec | 180 sec |
| 2 mm | 1 | 11.8 | 11.3 | 11.7 | 9.8 | 10.6 | 10.8 |
| | 2 | 6.6 | 7.3 | 7.1 | 6.3 | 7.5 | 7.1 |
| 3 mm | 1 | 5.0 | 4.7 | 4.7 | 5.5 | 4.9 | 5.2 |
| | 2 | 7.4 | 5.5 | 7.4 | 7.8 | 7.8 | 7.6 |
| 4 mm | 1 | 4.3 | 3.8 | 4.0 | 4.7 | 4.9 | 4.4 |
| | 2 | 5.9 | 6.1 | 7.2 | 7.3 | 6.7 | 6.3 |

EXAMPLE 2

In this example, the same organopolysiloxane material from Example 1 and having the same cone penetration and elongation values was used. In this example side 1 of each sheet was coated with a 3% solution of benophenone in 2-propanol and allowed to dry. Side 1 of each sheet was then exposed to the same UV light source used in Example 1 for the time periods indicated up to 180 seconds. After the exposure the surface tackiness or adhesion of side 1 and side 2 of each sheet was measured in accordance with Example 1. The results are set forth in the following Table 2.

TABLE 2

| Sample | Side | Adhesion | | | | | |
|---|---|---|---|---|---|---|---|
| | | time = 0 | 10 sec | 30 sec | 60 sec | 120 sec | 180 sec |
| 2 mm | 1 | 4.5 | 4.3 | 3.7 | 1.2 | 1.0 | 0.5 |
| | 2 | 4.5 | 4.2 | 4.4 | 4.7 | 4.8 | 4.3 |
| 3 mm | 1 | 4.4 | 3.7 | 3.5 | 2.7 | 1.5 | 0.8 |
| | 2 | 4.7 | 4.3 | 5.0 | 5.2 | 5.7 | 5.3 |
| 4 mm | 1 | 4.4 | 3.4 | 1.4 | 1.2 | 1.0 | 0.08 |
| | 2 | 4.7 | 4.3 | 4.2 | 4.7 | 4.5 | 4.3 |

EXAMPLE 3

In this example, the same organopolysiloxane fluid was used as in Example 1 except at 0.5% by weight benzophenone was mixed with the fluid before it was cured to the cone penetration and ultimate elongation values set forth in Example 1. A 3 mm thick sheet of the crosslinked material was exposed to the same UV light source used in Examples 1 and 2 for the time periods indicated in the following table up to 180 seconds. After the UV light exposure the surface tackiness or adhesion of each side of the sheet was measured in accordance with Example 1. The results are set forth in the following Table 3.

| Sample | Side | Adhesion | | | | | |
|---|---|---|---|---|---|---|---|
| | | time = 0 | 10 sec | 30 sec | 60 sec | 120 sec | 180 sec |
| 3 mm | 1 | 9.4 | 8.6 | 4.8 | 2.8 | 2.1 | 1.8 |
| | 2 | 5.1 | 5.7 | 5.3 | 5.3 | 5.9 | 5.3 |

EXAMPLE 4

In this example, an organopolysiloxane fluid which is a mixture of trimethyl terminated poly dimethylsiloxane with 5% by weight divinyl terminated dimethylpolysiloxane and 0.5% benzoyl peroxide was heat cured under nitrogen at a temperature of 150° C. to a cone penetration of 260 and ultimate elongation of 850%. The material was crosslinked in a sheet 3 mm thick. No additives were applied to the surface of the sheet in this example. Side 1 of the sheet was exposed to the same ultraviolet light source as in the above examples for the periods of time indicated in the following table. After the UV light exposure the surface tackiness or adhesion was measured in accordance with Example 1 and the results are set forth below in Table 4.

TABLE 4

| Time of UV Exposure: (Seconds) | 0 | 10 | 30 | 60 | 120 | 180 |
|---|---|---|---|---|---|---|
| ADHESION No additives | | | | | | |
| Side 1 | 2.5 | 2.8 | 2.8 | 2.9 | 3.2 | 3.6 |

TABLE 4-continued

| Time of UV Exposure: (Seconds) | 0 | 10 | 30 | 60 | 120 | 180 |
|---|---|---|---|---|---|---|
| Side 2 | 3.1 | 2.9 | 2.7 | 2.8 | 2.9 | 2.7 |
| Ratio (Side ½) | 0.81 | 0.96 | 0.97 | 1.04 | 1.10 | 1.33 |

EXAMPLE 5

The same organopolysiloxane fluid of Example 4 was cured to the same cone penetration and ultimate elongation values as Example 4 and a sheet 3 mm thick. A 3% solution of benzophenone and 2-propanol was applied to side 1 of the sheet then side 1 was exposed to the same ultraviolet light source as in the previous examples. After exposure to the UV light the surface tackiness or adhesion was measured in accordance with Example 1 and the results are set forth in the following Table 5.

TABLE 5

| Time of UV Exposure: (Seconds) | 0 | 10 | 30 | 60 | 120 | 180 |
|---|---|---|---|---|---|---|
| ADHESION Benzophenone on side 1 | | | | | | |
| Side 1 | 3.0 | 1.9 | 0.8 | 0.4 | 0.2 | 0.1 |
| Side 2 | 2.8 | 2.5 | 2.7 | 2.6 | 2.8 | 2.8 |
| Ratio (Side ½) | 1.07 | 0.76 | 0.30 | 0.15 | 0.07 | 0.03 |

EXAMPLE 6

In this example, the same organopolysiloxane fluid as in Example 4 was used with 0.5% benzophenone mixed in the fluid then cured to the above cone penetration and ultimate elongation values in Example 4. Side 1 of the sheet, which is 3 mm thick, was exposed to the same ultraviolet light source as indicated above for the periods of time set forth below. The surface tackiness or adhesion was then measured on both sides of the sheet and the results are set forth below in Table 6.

TABLE 6

| Time of UV Exposure: (Seconds) | 0 | 10 | 30 | 60 | 120 | 180 |
|---|---|---|---|---|---|---|
| ADHESION Benzophenone in fluid | | | | | | |
| Side 1 | 3.2 | 2.2 | 1.3 | 0.6 | 0.3 | 0.1 |
| Side 2 | 3.8 | 3.8 | 3.6 | 3.4 | 3.6 | 3.7 |
| Ratio (Side ½) | 0.84 | 0.58 | 0.36 | 0.18 | 0.08 | 0.05 |

We claim:

1. A method of reducing the surface tack of crosslinked organopolysiloxane materials having cone penetration between about 100 and about 350 ($10^{-1}$ mm) and ultimate elongation at least about 100% which comprises:
   applying to the surface of said material an effective amount of an organic peroxide or a photoinitiator; and
   irradiating the surface with ultraviolet light to effect a further crosslinking of the surface of said material to reduce the surface tack thereof without effecting significant further crosslinking of said material below said surface.

2. A method according to claim 1 wherein the organic peroxide comprises benzoyl peroxide.

3. A method according to claim 1 wherein the photoinitiator comprises benzophenone.

4. A method according to claim 1 wherein the peroxide comprises tert-butyl peroxy benzoate.

5. A method according to claim 1 wherein the photoinitiator comprises a substituted acetophenone.

6. A method of producing a crosslinked organopolysiloxane material having cone penetration between about 100 and about 350 ($10^{-1}$ mm) and ultimate elongation of at least about 100% and having reduced surface tack which comprises:
   mixing in an organopolysiloxane fluid an effective amount of a photoinitiator;
   thermally crosslinking said organopolysiloxane fluid to a cone penetration between about 100 and about 350 ($10^{-1}$ mm) and an ultimate elongation of at least about 100%; and
   irradiating the surface with ultraviolet light to effect a further crosslinking of the surface of said material to reduce the surface tack thereof without effecting significant further crosslinking of said material below said surface.

7. A method according to claim 6 wherein the photoinitiator comprises benzophenone.

8. A method according to claim 6 wherein the photoinitiator comprises a substituted acetophenone.

9. A method according to claim 6 wherein the photoinitiator comprises anthraquinone.

10. A method according to claim 6 wherein the photoinitiator comprises triphenylamine.

11. A method of producing a crosslinked organopolysiloxane material having cone penetration between about 100 and 350 ($10^{-1}$ mm) and ultimate elongation of at least about 100% and having reduce surface tack which comprises:
    mixing in an organopolysiloxane fluid an effective amount of a photoinitiator;
    crosslinking said organopolysiloxane fluid to a material having cone penetration between about 100 and about 350 ($10^{-1}$ mm) and an ultimate elongation of at least about 100% by irradiating said fluid with ultraviolet light; and
    irradiating a surface of said material with ultraviolet light to effect a further crosslinking of the surface of said material to reduce the surface tack thereof without effecting significant further crosslinking of said material below said surface.

12. A method according to claim 11 wherein the organopolysiloxane further contains an organic peroxide in mixture therewith.

13. A method according to claim 11 wherein the photoinitiator comprises benzophenone.

14. A method according to claim 11 wherein the crosslinking of the organopolysiloxane fluid is effected simultaneously with the crosslinking of the surface by irradiating two sides of the fluid with different intensity ultraviolet light.

15. An organopolysiloxane material having cone penetration between about 100 and about 350 ($10^{-1}$ mm) and ultimate elongation of at least 100% and having reduced surface tack formed by:
    applying to the surface of said material an effective amount of an organic peroxide or a photoinitiator; and
    irradiating the surface with ultraviolet light to effect a further crosslinking of the surface of said material to reduce the surface tack thereof without effecting significant further crosslinking of said material below said surface.

16. An organopolysiloxane material having cone penetration between about 100 and about 350 ($10^{-1}$ mm) and ultimate elongation of at least 100% and having reduced surface tack formed by:
    mixing in an organopolysiloxane fluid an effective amount of a photoinitiator;
    thermally crosslinking said organopolysiloxane fluid to a cone penetration between about 100 and about 350 ($10^{-1}$ mm) and an ultimate elongation of at least about 100%; and
    irradiating the surface with ultraviolet light to effect a further crosslinking of the surface of said material to reduce the surface tack thereof without effecting significant further crosslinking of said material below said surface.

17. An organopolysiloxane material having cone penetration between about 100 and about 350 ($10^{-1}$ mm) and ultimate elongation of at least 100% and having reduced surface tack formed by:
    mixing in an organopolysiloxane fluid an effective amount of a photoinitiator;
    crosslinking said organopolysiloxane fluid to a material having cone penetration between about 100 and about 350 ($10^{-1}$ mm) and an ultimate elongation of at least about 100% by irradiating said fluid with ultraviolet light; and
    irradiating the surfce of said material with ultraviolet light to effect a further crosslinking of the surface of said material to reduce the surface tack thereof without effecting significant further crosslinking of said material below said surface.

18. A substrate having disposed thereon a material according to claim 15.

19. A substrate having disposed thereon a material according to claim 16.

20. A substrate having disposed thereon a material according to claim 17.

* * * * *